US 10,866,580 B2

(12) United States Patent
Yamamoto

(10) Patent No.: US 10,866,580 B2
(45) Date of Patent: Dec. 15, 2020

(54) POWER MANAGEMENT SYSTEM FOR PRODUCTION LINE

(71) Applicant: FUJI CORPORATION, Chiryu (JP)

(72) Inventor: Mizuho Yamamoto, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 206 days.

(21) Appl. No.: 16/068,968

(22) PCT Filed: Jan. 28, 2016

(86) PCT No.: PCT/JP2016/052433
§ 371 (c)(1),
(2) Date: Jul. 10, 2018

(87) PCT Pub. No.: WO2017/130341
PCT Pub. Date: Aug. 3, 2017

(65) Prior Publication Data
US 2019/0018393 A1 Jan. 17, 2019

(51) Int. Cl.
G05B 19/418 (2006.01)
G05B 15/02 (2006.01)
G06F 1/26 (2006.01)

(52) U.S. Cl.
CPC ......... G05B 19/4185 (2013.01); G05B 15/02 (2013.01); G05B 19/418 (2013.01); G06F 1/26 (2013.01); Y02P 80/10 (2015.11); Y02P 90/02 (2015.11)

(58) Field of Classification Search
CPC .. G05B 19/4185; G05B 15/02; G05B 19/418; G06F 1/26
USPC ....................................................... 700/286
See application file for complete search history.

(56) References Cited

U.S. PATENT DOCUMENTS 4,677,566 A * 6/1987 Whittaker ............. G06F 1/3209
700/295
2016/0234984 A1* 8/2016 Itoh .................... H05K 13/0465

FOREIGN PATENT DOCUMENTS

JP 10-202482 A 8/1998
JP 11-237933 A 8/1999
JP 2003-133789 A 5/2003

OTHER PUBLICATIONS

Mouzon, et al., 2007. Operational methods for minimization of energy consumption of manufacturing equipment. International Journal of Production Research, vol. 45, Nos. 18-19, 4247-4271. Retrieved from https://soar.wichita.edu/handle/10057/3435 Mar. 30, 2020 (Year: 2007).*

(Continued)

Primary Examiner — Mohammad Ali
Assistant Examiner — Joshua T Sanders
(74) Attorney, Agent, or Firm — Oblon, McClelland, Maier & Neustadt, L.L.P.

(57) ABSTRACT

A component-mounted-board production line includes a power operation switch configured to be operated by an operator to turn power on and off, and an automatic power on and off circuit section configured to turn the power on and off. There is provided a production management means for, in a case where the multiple devices include a device that stops operating and enters a standby state, inputting a power on and off signal to the automatic power on and off circuit section of the device such that the power to device is turned on and off in accordance with an operation state of another device.

9 Claims, 5 Drawing Sheets

(56) References Cited

OTHER PUBLICATIONS

International Search Report dated Apr. 26, 2016 in PCT/JP2016/052433 filed Jan. 28, 2016.

* cited by examiner

POWER MANAGEMENT SYSTEM FOR PRODUCTION LINE

TECHNICAL FIELD

The present application relates to a power management system for a production line in which multiple devices that operate using electric power supplied from an external power supply as a source of power are arranged.

BACKGROUND ART

For example, regarding a component-mounted-board production line in which components are mounted on circuit boards to produce component-mounted-boards, as described in patent literature 1 (JP-A 2003-133789), the component-mounted-board production fine is constituted by multiple devices, such as component mounters and solder printers, arranged in a line along the conveyance path for the circuit boards, and a power supply line for supplying external power is provided for each of the devices to thereby supply external power to each of the devices.

CITATION LIST

Patent Literature

Patent Literature 1: JP-A 2003-133789

BRIEF SUMMARY

Technical Problem

The multiple devices constituting the component-mounted-board production line may include a device having a long standby time (operation stop time) during production depending on the form of production, such as production of a large variety of goods in small batches; however, each of the devices consumes power even in a standby state. Therefore, from the viewpoint of power saving, it is desirable to turn off the power of a device for which the standby time is relatively long; however, the power of each device is turned on and off by an operator performing an on and off operation of the power operation switch, that is, the operator needs to determine a time period in which each device stops operating and enters a standby state and to perform an on and off operation of the power operation switch, which is very troublesome. Furthermore, it is difficult for the operator to accurately determine the timing at which a device for which the power has been turned off is to be restarted, and therefore, the operator may perform an operation of turning on the power operation switch of the device at a later timing, which may hinder production.

The issues described above are not only issues for component-mounted-board production lines but also are issues for various production lines in which multiple devices that operate using electric power supplied from an external power supply as power are arranged.

Solution to Problem

To address the above-described issues, the present disclosure provides a power management system for a production line including multiple devices that are arranged therein and each operate using electric power supplied from an external power supply as a source of power to produce products obtained by sequential processing by the multiple devices; each of the multiple devices includes a power operation switch configured to be operated by an operator to turn the power on and off, and an automatic power on and off circuit section configured to turn the power on and off based on an external signal; and the power management system includes a power management means configured to, in a case where the multiple devices include a device A that stops operating and enters a standby state, input a signal to the automatic power on and off circuit section of the device A such that the power to device A is turned on and off in accordance with an operation state of another device.

In this configuration, each of the multiple devices constituting the production line includes the automatic power on and off circuit section configured to turn the power on and off based on the external signal, and in a case where the multiple devices include the device A, which stops operating and enters a standby state, the power management means inputs a signal to the automatic power on and off circuit section of the device A such that the power to device A is turned on and off in accordance with the operation state of another device, and therefore, the power management means can determine a time period in which each device will stop operating and enter a standby state during production and automatically turn off the power of the device A that will enter a standby state, and the power management means can determine the timing at which the device A is to be restarted and automatically turn on the power of the device A. Accordingly, it is possible to automatically turn on and off the power of each device involved in production and to achieve power saving of the production line while saving operators time and effort.

Here, the automatic power on and off circuit section may be configured to be supplied with power from the external power supply via a power operation switch. With this configuration, in a state where the power operation switch has been turned off, power is not supplied to the automatic power on and off circuit section from the external power supply, therefore the automatic power on and off circuit section does not operate, thus, for a device for which an operator has intentionally turned the power operation switch off to turn off the power, even if a power-on signal is externally input to the automatic power on and off circuit section of the device, the power of the device remains off. Accordingly, for a device for which an operator intentionally turns the power operation switch off to turn off the power, it is possible to prevent the power of the device from being turned on by the automatic power on and off circuit section against the operator's intention.

The power that is turned on and off by the automatic power on and off circuit section may include power of a control computer of the device. With this configuration, the power of all electric and electronic parts controlled by the control computer of the device and the power of the control computer can be turned on and off by the automatic power on and off circuit section, which results in an increased power saving effect. However, the present disclosure may be configured so that only the power of various electric and electronic parts in the device is turned on and off by the automatic power on and off circuit section and the power of the control computer of the device is not turned on and off by the automatic power on and off circuit section.

In a specific power management method performed by the power management means, for a device B for which the power is turned on, a timing at which the power of the device B is to be turned off may be controlled by taking into consideration a time T1 from when a product item is unloaded from the device B to when a next product item is thereafter loaded to the device B, a start-up time T2 from when the power of the device B is turned on to when the device B is ready for production, and a predetermined allowance time T3, which includes an error of T1 and T2 and so on. In this case, if a relationship expressed by T1≥T2+T3 is satisfied, the power of the device B may be turned off.

For a device C for which the power is turned off by the automatic power on and off circuit section, a timing at which the power of the device C is to be turned on may be controlled by taking into consideration a time T4 until when a next product item is to be loaded to the device C, a start-up time T5 from when the power of the device C is turned on to when the device C is ready for production, and a predetermined allowance time T6, which includes an error of T4 and T5 and so on. In this case, if a relationship expressed by T4≤T5+T6 is satisfied, the power of the device C may be turned on to restart the device C.

In the present disclosure, as the power management means, a production management computer configured to manage production by the production line may be used or the control computer of a furthest-upstream device among the multiple devices constituting the production line or the control computer of each of two or more devices including the furthest-upstream device among the multiple devices constituting the production line may be used.

In a case where the production management computer is used as the power management means, in a production management program (production job) executed by the production management computer, a timing at which the power of each of the multiple devices constituting the production line is to be turned on and off may be set.

On the other hand, in a case where the control computer of the furthest-upstream device among the multiple devices or the control computer of each of the two or more devices including the furthest-upstream device among the multiple devices is used as the power management means, the control computer of the device or the control computer of each of the devices may turn the power of the another device on and off after obtaining production information from the production management computer configured to manage production by the production line or the control computer of another device, or from both the production management computer configured to manage production by the production line and the control computer of another device. Accordingly, the control computer of the device that is used as the power management means can obtain production information regarding another device necessary for determining the timing at which the power of the other device is to be turned on and off from the production management computer or the control computer of the other device, or both, via a network of the production line whenever necessary, and can determine the timing at which the power of the other device is to be turned on and off.

The present disclosure is applicable to a production line having any configuration as long as multiple devices that operate using electric power supplied from an external power supply as a source of power are arranged in the production line and may be applied to, for example, a component-mounted-board production line including the multiple devices, which include a component mounter. Accordingly, it is possible to achieve power saving of the component-mounted-board production line while saving the operator's time and effort.

DESCRIPTION OF EMBODIMENTS

Hereinafter, specific two embodiments, namely, first and second embodiments, which are embodiments of the present disclosure applied to a component-mounted-board production line, will be described.

First Embodiment

The first embodiment of the present disclosure will be described with reference to FIG. 1 to FIG. 5.

Figure 1:
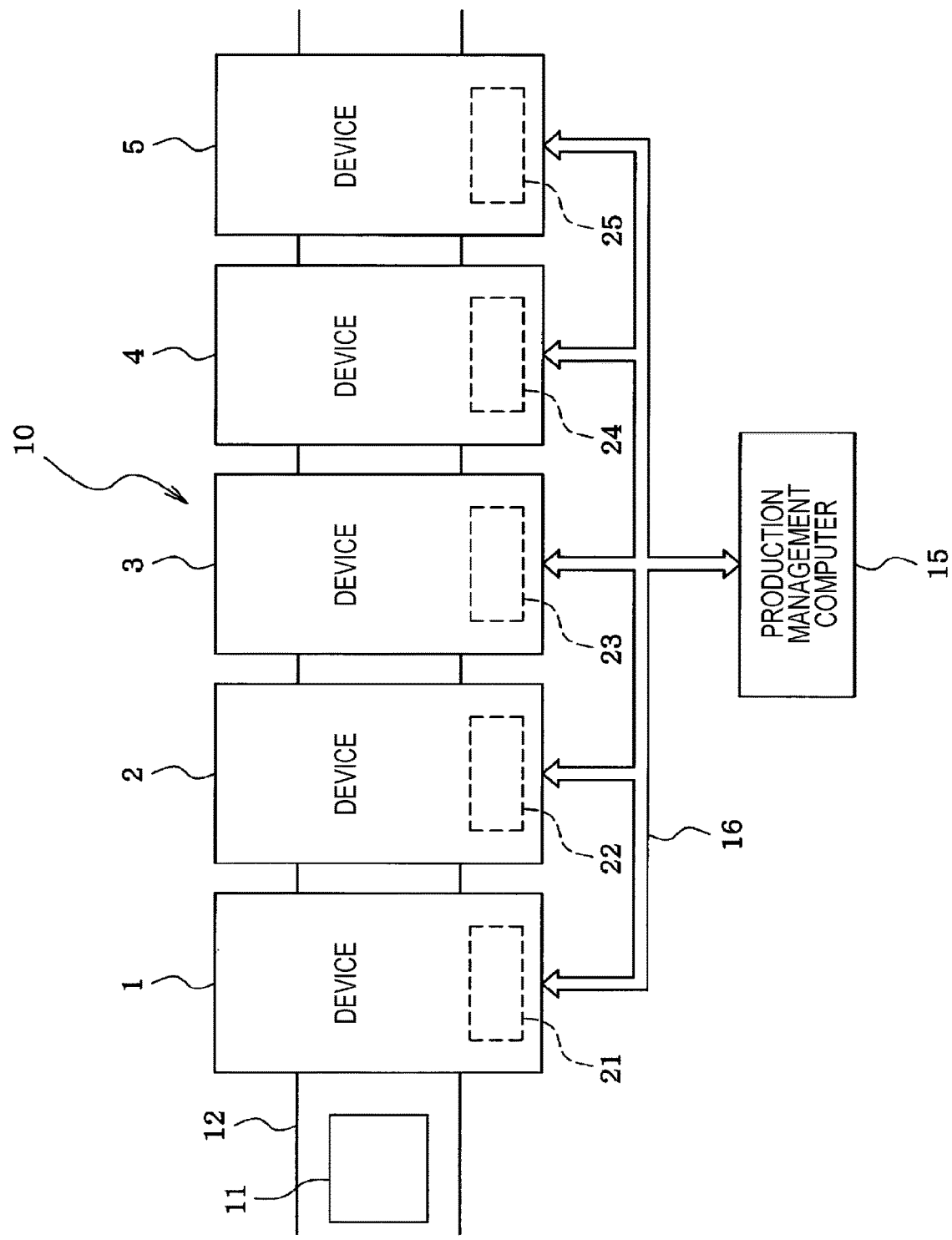
FIG. 1 is a block diagram schematically illustrating a configuration of a component-mounted-board production line in a first embodiment of the present disclosure.

First, the overall configuration of component-mounted-board production line 10 is described with reference to FIG. 1.

Component-mounted-board production line 10 (production line) is constituted by multiple devices 1 to 5 arranged along conveyance path 12 for circuit board 11. Each of multiple devices 1 to 5 is a component mounter, a solder printer, a reflow device, an inspection device, or a device of another type necessary for mounting components on circuit board 11 and producing a component-mounted-board, and is a device that operates using electric power supplied from an external power supply as a source of power. Production by component-mounted-board production line 10 is managed by production management computer 15, which is connected to control computers 21 to 25 of multiple devices 1 to 5 via network 16 so as to enable communication with each other.

Figure 2:
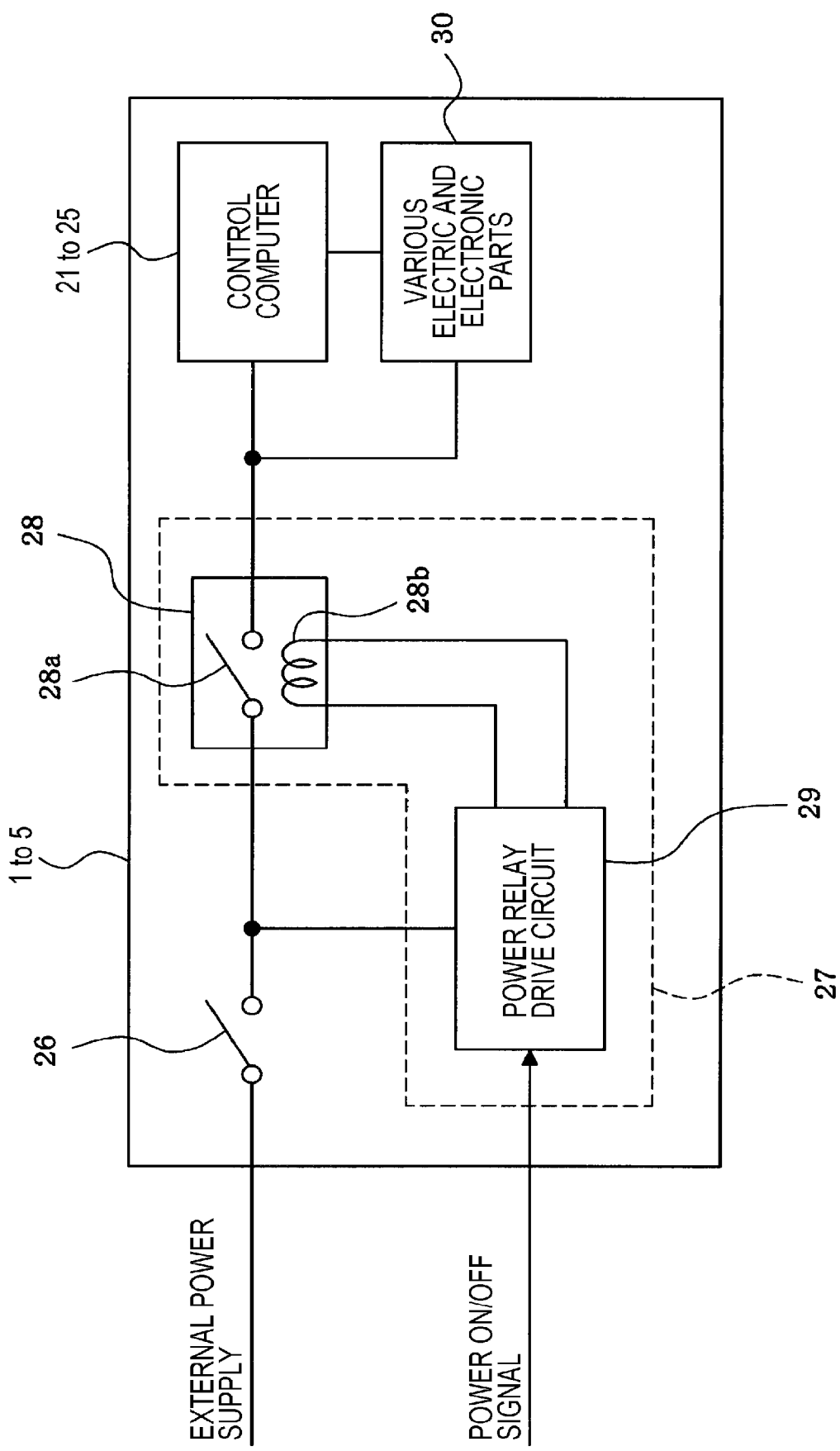
FIG. 2 is a block diagram illustrating a circuit configuration of an automatic power on and off circuit section and the surroundings.
Figure 3:
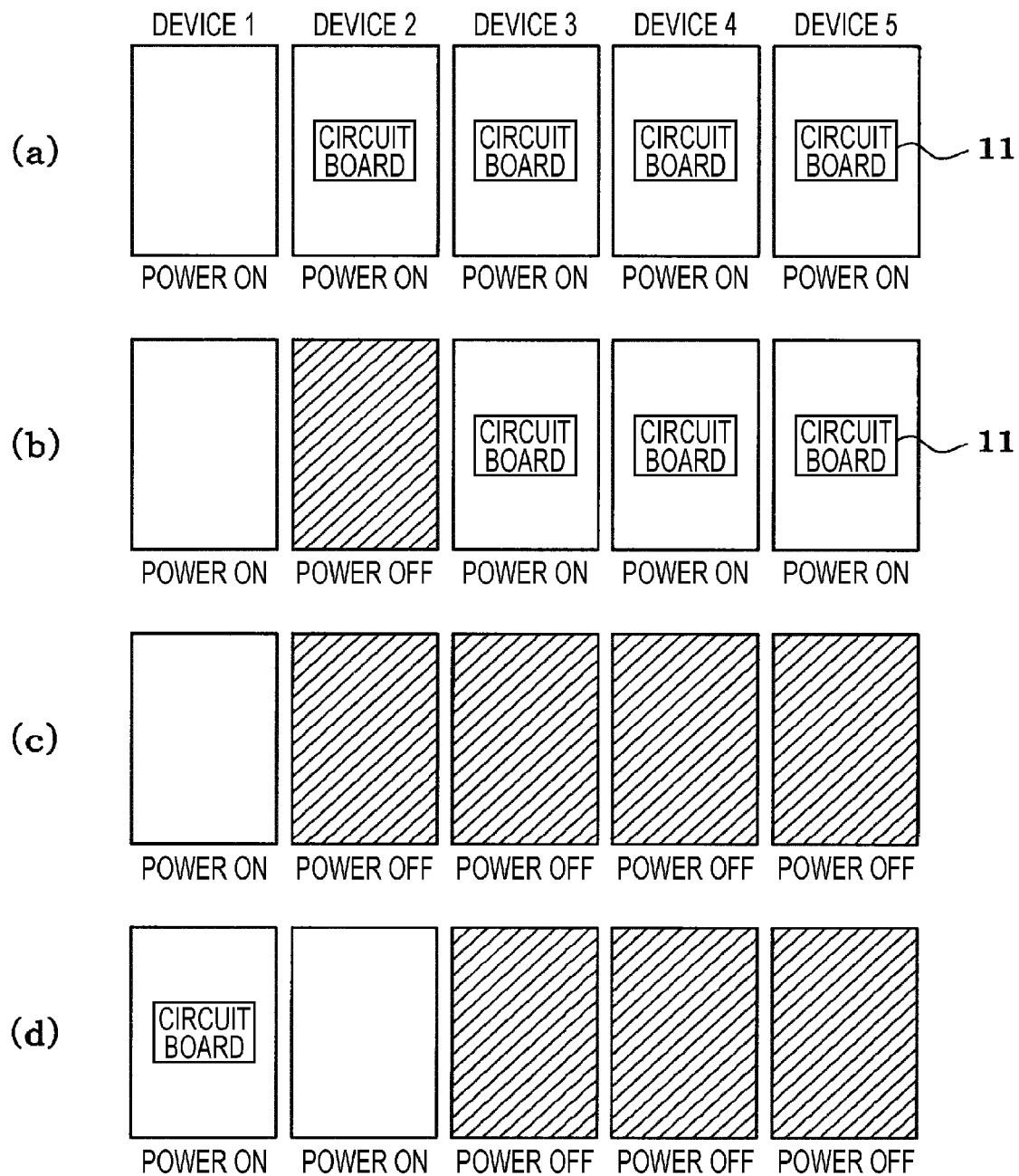
FIGS. 3(a) to 3(d) are diagrams for describing relationships between an operating/standby state of each of devices 1 to 5 and power on and off.

As illustrated in FIG. 2, each of devices 1 to 5 includes power operation switch 26, which is operated by an operator to turn on and off power supplied from the external power supply, and automatic power on and off circuit section 27, which turns on and off power based on an external power on and off signal. Automatic power on and off circuit section 27 is constituted by power relay 28, which is connected in series to power operation switch 26, and power relay drive circuit 29, which turns relay switch 28a of power relay 28 on and off. Power relay drive circuit 29 is supplied with power from the external power supply via power operation switch 26 and turns power supply to relay drive coil 28b on and off based on an external power on and off signal to thereby turn relay switch 28a of power relay 28 on and off. Therefore, control computers 21 to 25 of devices 1 to 5 and various electric and electronic parts 30 operate using electric power supplied from the external power supply via power operation switch 26 and via relay switch 28a of power relay 28 as a source of power.

Note that power relay 28 may be formed by using a normally closed relay or a normally open relay. In a case where power relay 28 is formed by using a normally closed relay, when a power-on signal is externally input to power relay drive circuit 29, power supply to relay drive coil 28b is turned off, relay switch 28a of power relay 28 is turned on, and the power of a corresponding one of control computers 21 to 25 of devices 1 to 5 and the power of various electric and electronic parts 30 are turned on, and when a power-off signal is externally input to power relay drive circuit 29, power supply to relay drive coil 28b is turned on, relay switch 28a of power relay 28 is turned off, and the power of a corresponding one of control computers 21 to 25 of devices 1 to 5 and the power of various electric and electronic parts 30 are turned off.

On the other hand, in a case where power relay 28 is formed by using a normally open relay, when a power-on signal is externally input to power relay drive circuit 29, power supply to relay drive coil 28b is turned on, and relay switch 28a of power relay 28 is turned on, and when a power-off signal is externally input to power relay drive circuit 29, power supply to relay drive coil 28b is turned off, and relay switch 28a of power relay 28 is turned off.

The present disclosure provides a power management means configured to, in a case where multiple devices 1 to 5 constituting component-mounted-board production line 10 include device A, which stops operating and enters a standby state, input a power on and off signal to automatic power on and off circuit section 27 of device A such that the power to device A is turned on and off in accordance with the operation state of another device.

In the first embodiment, control computer 21 of device 1, which is the furthest-upstream (uppermost) device among multiple devices 1 to 5 constituting component-mounted-board production line 10, is used as the power management means, and control computer 21 of the furthest-upstream device 1 turns the power of one of the devices 21 to 25 on and off after obtaining production information from production management computer 15 and/or one of control computers 22 to 25 of the other devices 2 to 5. While component-mounted-board production line 10 is operating, in the furthest-upstream device 1, relay switch 28a of power relay 28 is kept in an on state even if device 1 is in a standby state in order to turn the power of each of the other devices 2 to 5 on and off, and power is continuously supplied to control computer 21.

FIGS. 3(a) to 3(d) are diagrams for describing relationships between an operating/standby state of each of devices 1 to 5 and power on and off. As described above, in order to turn the power of each of the other devices 21 to 25 on and off, the furthest-upstream (first) device 1 is kept in a power-on state even if device 1 is in a standby state, and power is continuously supplied to control computer 21.

In the state in FIG. 3(a), circuit board 11 is loaded to each of the second and subsequent devices 2 to 5, and devices 2 to 5 are in an operating state, and therefore, are kept in a power-on state.

In the state in FIG. 3(b), circuit board 11 is unloaded from the second device 2, and the second device 2 enters a standby state, and therefore, the power of the second device 2 is turned off. Circuit boards 11 are loaded to the third and subsequent devices 3 to 5 from devices 2 to 4, which are adjacent to devices 3 to 5 respectively, and devices 3 to 5 are continuously in an operating state, and therefore, are kept in a power-on state.

In the state in FIG. 3(c), circuit boards 11 are unloaded from all of the second and subsequent devices 2 to 5, and all of the second and subsequent devices 2 to 5 enter a standby state, and therefore, the power of all of the second and subsequent devices 2 to 5 is turned off.

In the state in FIG. 3(d), circuit board 11 is loaded to the furthest-upstream device 1, and the furthest-upstream device 1 is in an operating state, and therefore, the power of the second device 2 is turned on so as to be ready for loading of the circuit board 11 to the second device 2 from the furthest-upstream device 1 performed thereafter. This is because the second device 2 needs a start-up time, which is a time from when the power of the second device 2 is turned on to when device 2 starts up to be ready for production. The third and subsequent devices 3 to 5 are kept in a power-off state because devices 2 to 4, which are the upstream devices, are in a standby state and circuit board 11 is not to be loaded for a while.

Figure 4:
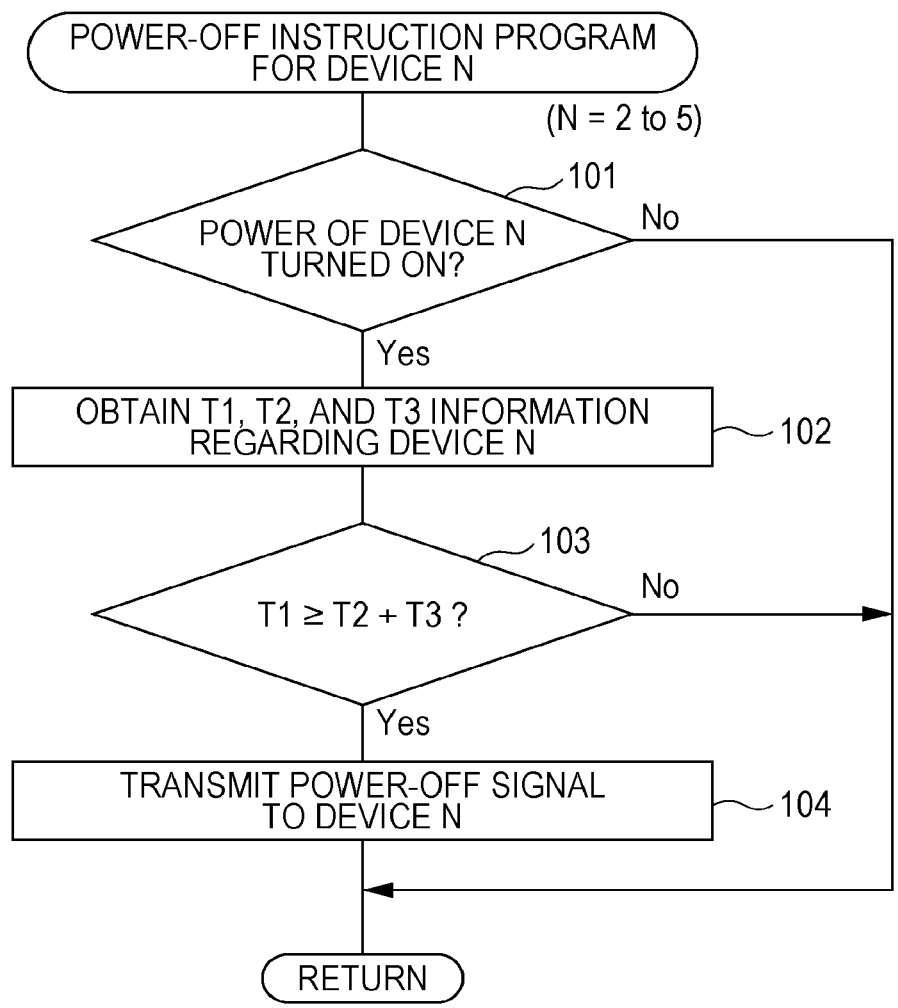
FIG. 4 is a flowchart illustrating a flow of processing of a power-off instruction program for device N (N=2 to 5) executed by a control computer of a furthest-upstream device.
Figure 5:
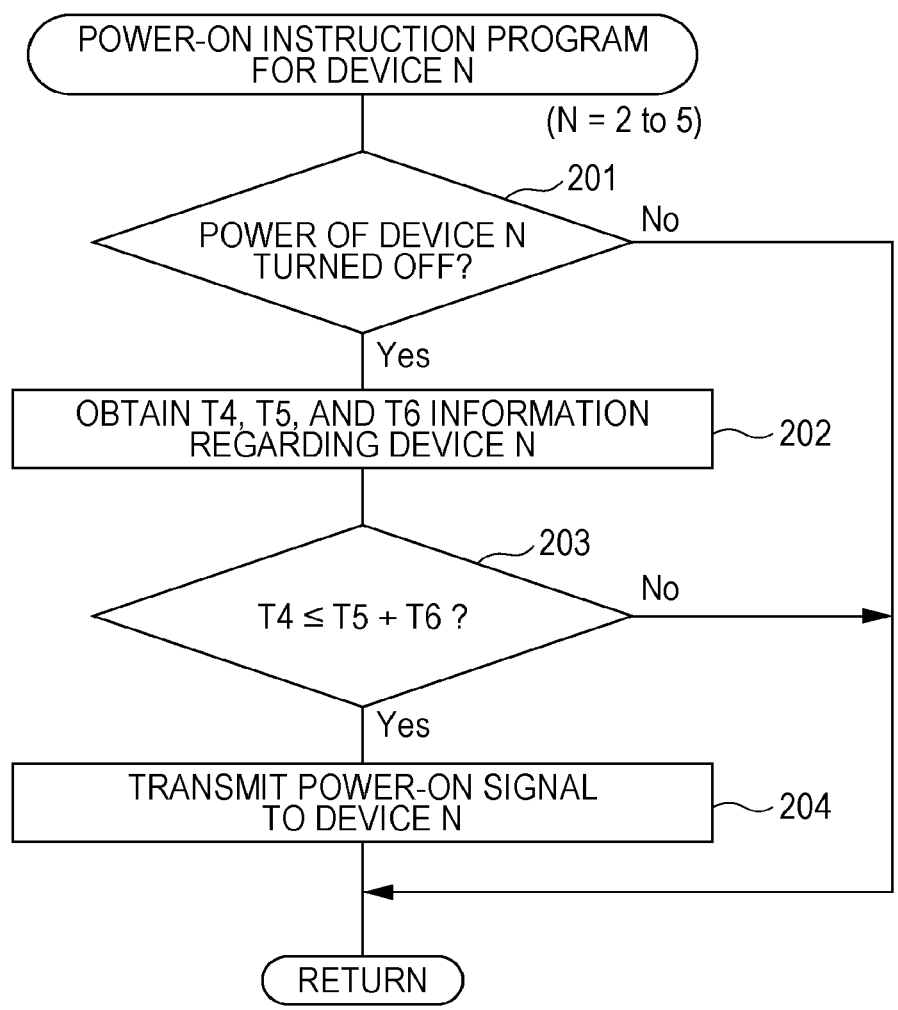
FIG. 5 is a flowchart illustrating a flow of processing of a power-on instruction program for device N (N=2 to 5) executed by the control computer of the furthest-upstream device.

Turning on and off the power of each of the second and subsequent devices 2 to 5 in the first embodiment described above is performed by control computer 21 of the furthest-upstream device 1 in accordance with programs illustrated in FIG. 4 and FIG. 5. In the first embodiment, the power of a device for which the following condition is satisfied is turned off to make the power-off time of each of devices 2 to 5 as long as possible. For device B for which the power is turned on, time T1 from when circuit board 11 is unloaded from device B to when the next circuit board 11 is thereafter loaded to device B, start-up time T2 from when the power of device B is turned on to when device B is ready for production, and predetermined allowance time T3, which includes an error of T1 and T2 and so on, are taken into consideration, and if a relationship expressed by $T1 \geq T2+T3$ is satisfied, the power of device B is turned off.

For device C for which the power is turned off by automatic power on and off circuit section 27, time T4 until when the next circuit board 11 is to be loaded to device C, start-up time T5 from when the power of device C is turned on to when device C is ready for production, and predetermined allowance time T6, which includes an error of T4 and T5 and so on, are taken into consideration, and if a relationship expressed by $T4 \leq T5+T6$ is satisfied, the power of device C is turned on, and device C is restarted so as to be ready for loading of the next circuit board 11.

In the first embodiment, control computer 21 of the furthest-upstream device 1, which is used as the power management means, obtains production Information (T1 to T6) regarding the other devices 2 to 5 necessary for determining the timing at which the power of each of the other devices 2 to 5 is turned on and off from production management computer 15 and/or control computers 22 to 25 of the other devices 2 to 5 via network 16 of component-mounted-board production line 10 whenever necessary, and determines the timing at which the power of each of the other devices 2 to 5 is to be turned on and off.

The details of processing of the programs illustrated in FIG. 4 and FIG. 5 and executed by control computer 21 of the furthest-upstream device 1 are described below.

Power-Off Instruction Program for Device N

A power-off instruction program for device N illustrated in FIG. 4 is repeatedly executed by control computer 21 of the furthest-upstream device 1 at predetermined intervals while power operation switch 26 is turned on in all devices 1 to 5. Here, device N represents one of devices 2 to 5, and similar processing is performed for each device.

When this program is started, it is first determined in step 101 whether the power of device N is turned on (whether relay switch 28a of power relay 28 is turned on) and if the power has been turned off, the program ends without performing the subsequent processing.

On the other hand, if it is determined in step 101 described above that the power of device N is turned on, the flow proceeds to step 102, production information regarding device N, specifically, information regarding time T1 from the present time to when the next circuit board 11 is loaded to device N, start-up time T2 from when the power of device N is turned on to when device N is ready for production, and predetermined allowance time T3, which includes an error of T1 and T2 and so on, is obtained from production management computer 15 and/or the control computer of device N via network 16. Here, in a case where circuit board 11 is loaded to device N at the present time, T1=0 is set.

Thereafter, the flow proceeds to step 103, it is determined whether the relationship expressed by T1≥T2+T3 is satisfied, and if it is determined that the relationship is not satisfied (that is, T1<T2+T3), it is determined that the power of device N is not allowed to be turned off, and the program ends without any further processing.

On the other hand, if it is determined in step 103 described above that the relationship expressed by T1≥T2+T3 is satisfied, it is determined that the power of device N can be turned off, the flow proceeds to step 104, a power-off signal is transmitted to device N, and the program ends. Accordingly, the power-off signal transmitted from control computer 21 of the furthest-upstream device 1 is input to power relay drive circuit 29 of device N, relay switch 28a of power relay 28 of device N is turned off, and the power of device N is turned off.

Power-On Instruction Program for Device N

A power-on instruction program for device N illustrated in FIG. 5 is repeatedly executed by control computer 21 of the furthest-upstream device 1 at predetermined intervals while power operation switch 26 is turned on in all devices 1 to 5. Here, device N represents one of devices 2 to 5, and similar processing is performed for each device.

When this program is started, it is first determined in step 201 whether the power of device N is turned off (whether relay switch 28a of power relay 28 is turned off) and if the power of device N has been turned on, the program ends without performing the subsequent processing.

On the other hand, if it is determined in step 201 described above that the power of device N is turned off (circuit board 11 has been unloaded from device N), the flow proceeds to step 202, production information regarding device N, specifically, information regarding time T4 from the present time to when the next circuit board 11 is to be loaded to device N, start-up time T5 from when the power of device N is turned on to when device N is ready for production, and predetermined allowance time T6, which includes an error of T4 and T5 and so on, is obtained from production management computer 15 and/or the control computer of device N via network 16.

Thereafter, the flow proceeds to step 203, it is determined whether the relationship expressed by T4≤T5+T6 is satisfied, and if it is determined that the relationship is not satisfied (that is, T4>T5+T6), it is determined that the power of device N need not be turned on, and the program ends without any further processing.

On the other hand, if it is determined in step 203 described above that the relationship expressed by T4≤T5+T6 is satisfied, it is determined that the power of device N needs to be turned on, the flow proceeds to step 204, and a power-on signal is transmitted to device N. Accordingly, the power-on signal transmitted from control computer 21 of the furthest-upstream device 1 is input to power relay drive circuit 29 of device N, relay switch 28a of power relay 28 of device N is turned on, the power of device N is turned on, and device N is restarted so as to be ready for loading of the next circuit board 11.

Switching for turning on and off the power of the furthest-upstream device 1 is controlled by production management computer 15. For example, in a case where the power of all of the second and subsequent devices 2 to 5 is turned off, the furthest-upstream device 1 is in a standby state, and the next circuit board 11 is not to be loaded to device 1 for a while, a power-off signal is transmitted to the furthest-upstream device 1 from production management computer 15 to turn off the power of the furthest-upstream device 1. Thereafter, at a point in time a predetermined time before the time when the next circuit board 11 is to be loaded to the furthest-upstream device 1, the predetermined time being the sum of a start-up time taken for the furthest-upstream device 1 to become ready for production and a predetermined allowance time, a power-on signal is transmitted to the furthest-upstream device 1 from production management computer 15 to turn on the power of the furthest-upstream device 1 and restart the furthest-upstream device 1 so as to be ready for loading of the next circuit board 11.

According to the first embodiment described above, multiple devices 1 to 5 constituting component-mounted-board production line 10 each include automatic power on and off circuit section 27, which turns power on and off based on an external power on and off signal, and in a case where the second and subsequent devices 2 to 5 include device A, which stops operating and enters a standby state, a power on and off signal is input to automatic power on and off circuit section 27 of device A from control computer 21 of the furthest-upstream device 1 such that the power to device A is turned on and off in accordance with the operation state of another device; therefore, control computer 21 of the furthest-upstream device 1 can determine a time period in which each of the second and subsequent devices 2 to 5 stops operating and enters a standby state during production and can automatically turn off the power of device A, which is in a standby state, and furthermore, control computer 21 of the furthest-upstream device 1 can determine the timing at which device A is to be restarted and can automatically turn on the power of device A. Accordingly, it is possible to automatically turn on and off the power of each of the second and subsequent devices 2 to 5 involved in production and to achieve power saving of the production line while saving operators time and effort.

Further, in the first embodiment, automatic power on and off circuit section 27 is configured to be supplied with power from the external power supply via power operation switch 26, and therefore, in a state where an operation is performed to turn off power operation switch 26, power is not supplied to automatic power on and off circuit section 27 from the external power supply, and automatic power on and off circuit section 27 does not operate, which means that, for a device for which an operator has intentionally turned off power operation switch 26, even if a power-on signal is externally input to automatic power on and off circuit section 27 of the device, the power of the device remains in an off state. Accordingly, for a device for which an operator intentionally turns off power operation switch 26 to turn off the power, it is possible to prevent the power of the device from being turned on by automatic power on and off circuit section 27 against the operator's intention.

Further, in the first embodiment, power that is turned on and off by automatic power on and off circuit section 27 includes the power of control computers 21 to 25 of devices 1 to 5, and therefore, the power of various electric and electronic parts 30 controlled by control computers 21 to 25 of the devices and the power of control computers 21 to 25 can be turned on and off by automatic power on and off circuit section 27, which results in an increased power saving effect. However, the present disclosure may be configured so that only the power of various electric and electronic parts 30 in devices 1 to 5 is turned on and off by automatic power on and off circuit section 27 and the power of control computers 21 to 25 of devices 1 to 5 is not turned on and off by automatic power on and off circuit section 27.

Note that, in the first embodiment, control computer 21 of the furthest-upstream device 1 controls switching for turning on and off the power of each of the second and subsequent devices 2 to 5; however, the control computers of two or more devices including the furthest-upstream device 1 may cooperatively control switching for turning on and off the power of each device.

Second Embodiment

Now, the second embodiment of the present disclosure will be described. However, sections substantially the same as in the first embodiment described above are assigned the same reference numerals and descriptions thereof will be omitted or briefly given, and sections different from the first embodiment will be mainly described.

In the first embodiment described above, among multiple devices 1 to 5 constituting component-mounted-board production line 10, control computer 21 of the furthest-upstream device 1 or the control computer of each of two or more devices including the furthest-upstream device 1 controls turning on and off the power of each device; however, in the second embodiment of the present disclosure, production management computer 15 is used as the power management means to make production management computer 15 control turning on and off the power of all devices 1 to 5.

In this case, production management computer 15 may perform processing similar to that of the programs illustrated in FIG. 4 and FIG. 5 and executed by control computer 21 of the furthest-upstream device 1 in the first embodiment described above to thereby control turning on and off the power of all devices 1 to 5.

Alternatively, the timing at which the power of each of multiple devices 1 to 5 constituting component-mounted-board production line 10 is to be turned on and off may be set in a production management program (production job) executed by production management computer 15, and switching for turning on and off the power of each of devices 1 to 5 may be controlled in accordance with the production management program.

In the second embodiment described above, switching for turning on and off power can be controlled by production management computer 15 also for the furthest-upstream device 1 in a manner similar to that for the second or subsequent device N while component-mounted-board production line 10 is operating, which can achieve a more significant power saving effect than that achieved by the first embodiment described above. In addition, an effect similar to that achieved by the first embodiment described above can be achieved.

Note that the present disclosure is not limited to the first and second embodiments described above and, for example, the number of devices, which are devices 1 to 5, constituting component-mounted-board production line 10 may be changed, the method for determining the timing at which turning on and off the power of each of devices 1 to 5 is to be performed may be changed as appropriate, or the configuration of automatic power on and off circuit section 27 may be changed.

In addition, the present disclosure is applicable not only to a component-mounted-board production line but also to, for example, a production line having any configuration as long as the production line includes multiple devices arranged therein and operating using electric power supplied from an external power supply as a source of power, that is, the present disclosure can be modified and embodied in various manners without departing from the spirit thereof, as a matter of course.

REFERENCE SIGNS LIST

1 to 5 . . . device, 10 . . . component-mounted-board production line (production line), 12 . . . conveyance path, 15 . . . production management computer (power management means), 16 . . . network, 21 . . . control computer (power management means) of furthest-upstream device, 22 to 25 . . . control computer of second or subsequent computer, 26 . . . power operation switch, 27 . . . automatic power on and off circuit section, 28 . . . power relay, 29 . . . power relay drive circuit, 30 . . . various electric and electronic parts

The invention claimed is:

1. A power management system for a production line including multiple devices that are arranged therein and each operate using electric power supplied from an external power supply as a source of power to produce products obtained by sequential processing by the multiple devices,
   each of the multiple devices including a power operation switch configured to be operated by an operator to turn the power on and off, and an automatic power on and off circuit section configured to turn the power on and off based on an external signal, the power management system comprising:
   a control computer configured to, in a case where the multiple devices include a device A that stops operating, input a signal to the automatic power on and off circuit section of the device A such that the power to device A is turned on and off in accordance with an operation state of another device,
   wherein, for a device B for which the power is turned on, the control computer controls a timing at which the power of the device B is to be turned off by taking into consideration a time T1 from when a product is unloaded from the device B to when a next product is thereafter loaded to the device B, a start-up time T2 from when the power of the device B is turned on to when the device B is ready for production, and a predetermined allowance time T3.

2. The power management system for a production line according to claim 1, wherein the automatic power on and off circuit section is configured to be supplied with power from the external power supply via the power operation switch.

3. The power management system for a production line according to claim 1, wherein the power that is turned on and off by the automatic power on and off circuit section includes power of a control computer of the device.

4. The power management system for a production line according to claim 1, wherein the control computer is a production management computer configured to manage production by the production line.

5. The power management system for a production line according to claim 4, wherein, in a production management program executed by the production management computer, a timing at which the power of each of the multiple devices is to be turned on and off is set.

6. The power management system for a production line according to claim 1, wherein the control computer is a computer of a furthest-upstream device among the multiple devices or of each of two or more devices including the furthest-upstream device among the multiple devices.

7. The power management system for a production line according to claim 6, wherein the control computer turns the power of the another device on and off after obtaining production information from a production management computer configured to manage production by the production line or the control computer of another device, or from both the production management computer configured to manage production by the production line and the control computer of another device.

8. The power management system for a production line according to claim 1, wherein the production line is a component-mounted-board production line including the multiple devices, which include a component mounter.

9. A power management system for a production line including multiple devices that are arranged therein and each operate using electric power supplied from an external power supply as a source of power to produce products obtained by sequential processing by the multiple devices, each of the multiple devices including a power operation switch configured to be operated by an operator to turn the power on and off, and an automatic power on and off circuit section configured to turn the power on and off based on an external signal, the power management system comprising:

a control computer configured to, in a case where the multiple devices include a device A that stops operating, input a signal to the automatic power on and off circuit section of the device A such that the power to device A is turned on and off in accordance with an operation state of another device, wherein, for a device C for which the power is turned off by the automatic power on and off circuit section, the control computer controls a timing at which the power of the device C is to be turned on by taking into consideration a time T4 until when a next product is to be loaded to the device C, a start-up time T5 from when the power of the device C is turned on to when the device C is ready for production, and a predetermined allowance time T6.

* * * * *